US009525607B2

(12) United States Patent
Poe (10) Patent No.: US 9,525,607 B2
(45) Date of Patent: Dec. 20, 2016

(54) CONNECTIVITY NOTIFICATION (71) Applicant: HEWLETT-PACKARD DEVELOPMENT COMPANY, L.P., Houston, TX (US)

(72) Inventor: Daryl T Poe, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 614 days.

(21) Appl. No.: 13/742,806

(22) Filed: Jan. 16, 2013

(65) Prior Publication Data

US 2014/0201353 A1    Jul. 17, 2014

(51) Int. Cl.
G06F 15/16 (2006.01)
H04L 12/26 (2006.01)
H04L 12/24 (2006.01)

(52) U.S. Cl.
CPC ....... H04L 43/0811 (2013.01); H04L 41/0622 (2013.01); H04L 41/069 (2013.01); H04L 41/0686 (2013.01)

(58) Field of Classification Search
None
See application file for complete search history.

(56) References Cited

U.S. PATENT DOCUMENTS

| | | | |
|---|---|---|---|
| 6,314,512 B1 | 11/2001 | Branson et al. | |
| 6,826,707 B1 | 11/2004 | Stevens | |
| 6,874,106 B2 | 3/2005 | Suzuyama et al. | |
| 7,203,487 B2 * | 4/2007 | Comp | 455/422.1 |
| 7,245,702 B1 | 7/2007 | Mahaney | |
| 7,742,400 B2 | 6/2010 | Liu | |
| 7,987,273 B2 | 7/2011 | Kaneko | |
| 2004/0204133 A1* | 10/2004 | Andrew et al. | 455/566 |
| 2005/0209804 A1* | 9/2005 | Basso et al. | 702/79 |
| 2006/0184842 A1* | 8/2006 | Boucher | 714/55 |
| 2009/0003387 A1* | 1/2009 | Bernardi et al. | 370/503 |

OTHER PUBLICATIONS

EMCO Software. EMCO Ping Monitor Product Data Sheet. Network Connection State Monitoring Tool.

* cited by examiner

*Primary Examiner* — Wing F Chan
*Assistant Examiner* — Padma Mundur
(74) *Attorney, Agent, or Firm* — HP Inc. Patent Department (57) ABSTRACT

An example method includes presenting a first notification indicating a potential interruption in connectivity between a server and a remote terminal. If the potential interruption is resolved before the expiration of a restart time interval, the first notification is removed. If the potential interruption is not resolved before the expiration of the restart time interval, a second notification is presented, the second notification indicating a loss of connectivity between the server and the remote terminal.

17 Claims, 5 Drawing Sheets

CONNECTIVITY NOTIFICATION

BACKGROUND

In current networks, such as enterprise networks that may communicate through both the world wide web (WWW) and local area networks (LAN), it is common to have a central database and/or one or more central servers. Each network accesses the central server in order to provide end-users with company data, such as software and directories. Because these networks may employ a number of terminal devices, remote access to terminals within those networks may also be required to provide those resources to various end-users of terminal devices.

BRIEF DESCRIPTION OF THE DRAWINGS

For a more complete understanding of examples of the present disclosure, reference is now made to the following descriptions taken in connection with the accompanying drawings in which.

DETAILED DESCRIPTION

Remote access to terminal computers may be provided through an application installed on the central server and/or remote terminals having access to the central server. Communication between the central server and the remote terminal may be interrupted, either temporarily or permanently, due to high traffic, security issues, service provider issues, signal loss, or similar circumstances, for example. Often, end-users may be unaware of the interruption and may be unaware of a reason for lack of response from the server.

Various examples of the present disclosure provide a system and method for use with a remote desktop client software program. One example method, which may be implemented on a remote computer, may monitor a communication exchange between the remote computer, e.g., a remote terminal, and a server and may generate a notification for a user of the remote computer when a connection loss occurs. The generation of the notification may be provided through a sentinel thread, which may be separate from a main thread. The main thread may provide protocol information and primary data exchange for end-to-end connectivity between the remote computer and server.

In various examples, the sentinel thread may be launched when specific conditions are met during the protocol information and primary data exchange in the main thread in order to minimize additional processing. The sentinel thread may monitor traffic between the remote terminal and the server and may generate notifications to the remote terminal, for example. In some examples, during interruption of connectivity, the sentinel thread may detect the resulting lack of data exchange and may generate a notification. If traffic communication (e.g., data exchange) is detected after generation of the notification (e.g., restoration of connectivity), the sentinel thread may return the remote terminal to an active state and may enter sleep mode.

In some examples described herein, a main thread may include primary data exchange between the remote terminal and the server. In addition, the main thread may also include a set of instructions executed by the processor on the remote terminal to implement a remote desktop protocol. In various examples, the main thread may include instructions to run the client side remote desktop protocol on a remote terminal within a network.

In some examples, a sentinel thread may be a secondary thread that may be spawned by the main thread and may be executed simultaneously with the main thread.

Example systems for implementing a remote desktop protocol on a remote terminal and for generating a notification on that remote terminal when a connection loss occurs are described in the following paragraphs. In this regard, a sentinel thread that is separate from the main thread may monitor connectivity between the remote terminal and a server. Upon a first indication that connectivity may have been interrupted or lost (e.g., failure to receive data from the server for a first time interval), the sentinel thread may issue a first notification to the user of a possible interruption. Upon further indication of interruption of connectivity (e.g., failure to receive data from the server for a second time interval), the sentinel thread may issue a second notification to the user and/or provide the user with the option of restarting the connection. If data is received before the expiration of the second time interval, the first notification may be removed to indicate restoration of connectivity, for example.

Figure 1:
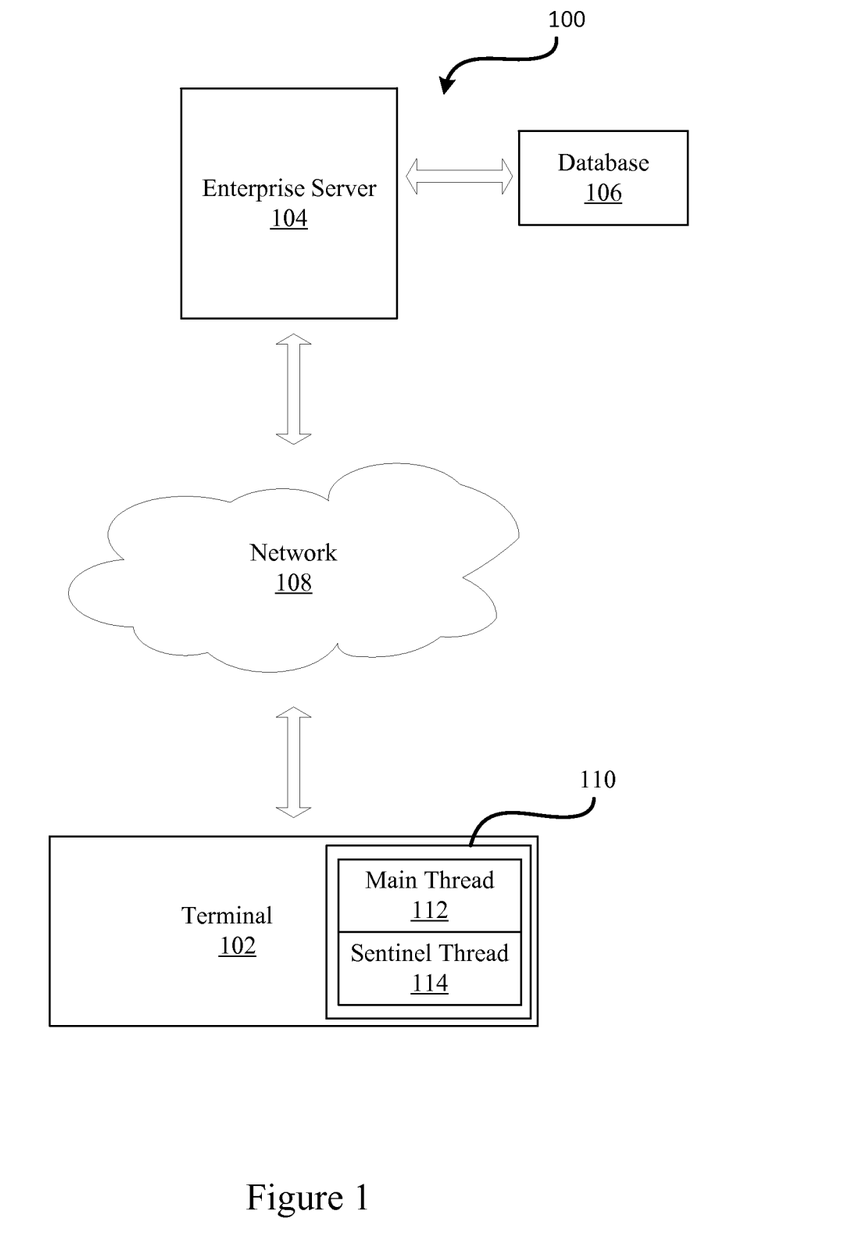
FIG. 1 is a schematic illustration of a system in accordance with one example.

Referring now to FIG. 1, an example system 100 in accordance with one example is schematically illustrated. The system 100 includes various components, such as servers and terminals, which may be capable of implementing a remote connection, such as remote desktop protocol (RDP), for example. The example system 100 may be implemented within a network, such as an enterprise network (e.g., a virtual private network (VPN)) for a company having offices in multiple geographical locations, for example. In the illustrated example system 100, a central enterprise server 104 and database 106 are provided to be accessible by other devices. For example, the system 100 may include one or more terminals, such as the remote terminal 102, from which end-users can access data and resources through the enterprise server 104. The enterprise server 104 may be coupled to the database 106 storing data and/or programs that may be accessed by various end-users within. The database may contain server-side resources, such as various application software programs, which may be pushed to a remote terminal computer in the network, for example. Additionally, remote desktop protocol (RDP) application software, which can be run by the server in order to allow connection by end-user devices may be stored on the database 106 and run by the enterprise server 104.

In one example, the terminal 102 may be a terminal through which a user may form a remote desktop connection to the enterprise server 104. Further, the terminal 102 may form a connection, through the enterprise server 104, with other entities, such as other servers or terminals. In the example illustrated in FIG. 1, the terminal 102 may communicate with the enterprise server 104 through a network 108. In some examples, the terminal 102 may be located in the same geographical location as the enterprise server 104 and may communicate with the enterprise server 104 through a local area network (LAN), such as a wideband local area network (WLAN). In other examples, the terminal 102 is remotely located from the enterprise server 104 and may communicate with the enterprise server 104 through a wide area network (WAN) which may be a public network, such as the Internet. As used herein, the term "remote terminal" refers to any terminal that is separate from the enterprise server 104 and communicates with the enterprise server 104 through a connection, the connection being either a direct connection or through any network.

The remote terminal 102 illustrated in the example of FIG. 1 includes a remote desktop application 110 executing on, for example, a processor of the remote terminal 102. In various examples, the remote desktop application 110 allows the remote terminal 102 to communicate with the server 104 and access various applications and/or data on or through the server 104. The example remote desktop application 110 illustrated in FIG. 1 includes a main thread 112 and a sentinel thread 114. As described within the present disclosure, various examples of the main thread 112 may be used for primary data exchange between the remote terminal 102 and the server 104. An example process associated with the main thread 112 is described below with reference to FIG. 3. Further, as described within the present disclosure, various examples of the sentinel thread 114 may be used to monitor connectivity between the remote terminal 102 and the server 104 and to provide notifications to the user to indicate potential and/or actual loss of connectivity. An example process associated with the sentinel thread 114 is described below with reference to FIG. 4.

Figure 2:
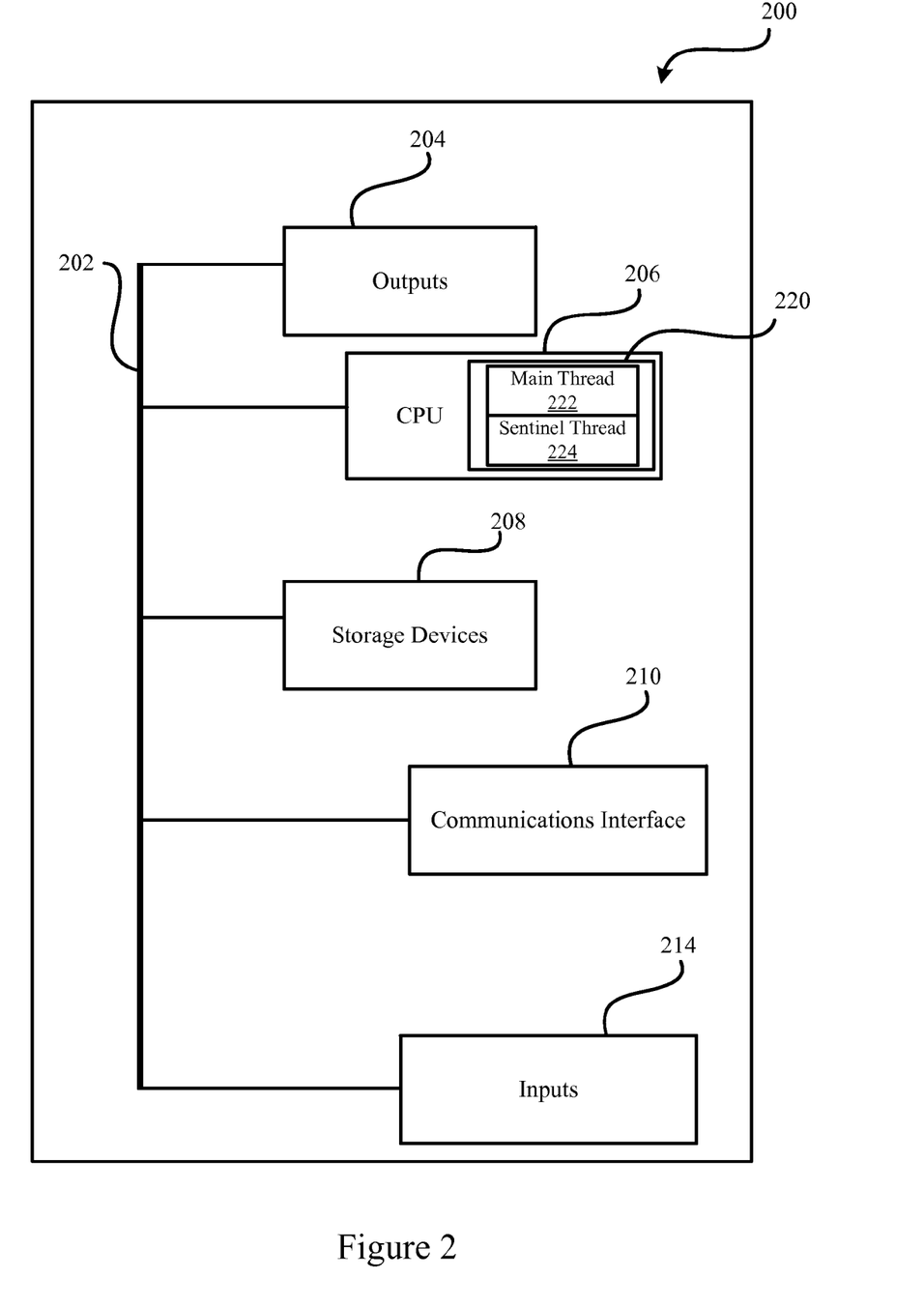
FIG. 2 is a block diagram of an apparatus in accordance with an example.

Referring now to FIG. 2, a block diagram of an apparatus 200 in accordance with an example is illustrated. The example apparatus 200 may be a computer system can be utilized as the enterprise server 104 or the terminal 102 of FIG. 1. The apparatus 200 includes one or more outputs 204 such as a display for displaying a graphical user interface (GUI), one or more input devices 214 such as a keyboard and/or mouse, one or more central processing units (CPUs) 206, one or more communications interfaces 210 such as a wireless interface or an Ethernet or other wired interface, and one or more storage devices 208 such as a computer-readable medium.

The storage devices 208 may include one or more memory devices, such as random access memory (RAM), read only memory (ROM), erasable programmable ROM (EPROM), electrically EPROM (EEPROM), flash memory, or any other non-volatile or volatile memory. The storage devices 208 may store code including instructions for execution by a processor (e.g., CPU 206). For example, the storage devices 208 may store an operating system (OS) of the apparatus 200 and one or more application software programs, such as the remote desktop protocol for the server or client. The various components may be coupled to each other through a system bus 202, for example.

The elements within the apparatus 200 of FIG. 2 are not limited to those illustrated and may include any number of additional elements specific to the functions of that particular apparatus 200. For example, the apparatus 200 can also include a digital signal processor (DSP), additional memory elements and interfaces, an optical signal processor, one or more adapters configured to communicate information between the bus and an input device, output device or interface. The application programs can also include various software programs readable by one or more of the processors. For example, in one example, the apparatus 200 can be the enterprise server 104 in FIG. 1 and may include the remote desktop software capable of providing remote desktop access to remote terminals.

In one example, the apparatus 200 is a remote terminal, such as the remote terminal 102 illustrated in FIG. 1. As described above with reference to FIG. 1, the apparatus 200 may include an example remote desktop application 220 executing on, for example, the CPU 206 of the apparatus 200. The example remote desktop application 220 illustrated in FIG. 2 includes a main thread 222 and a sentinel thread 224, similar to those described above with reference to FIG. 1.

Figure 3:
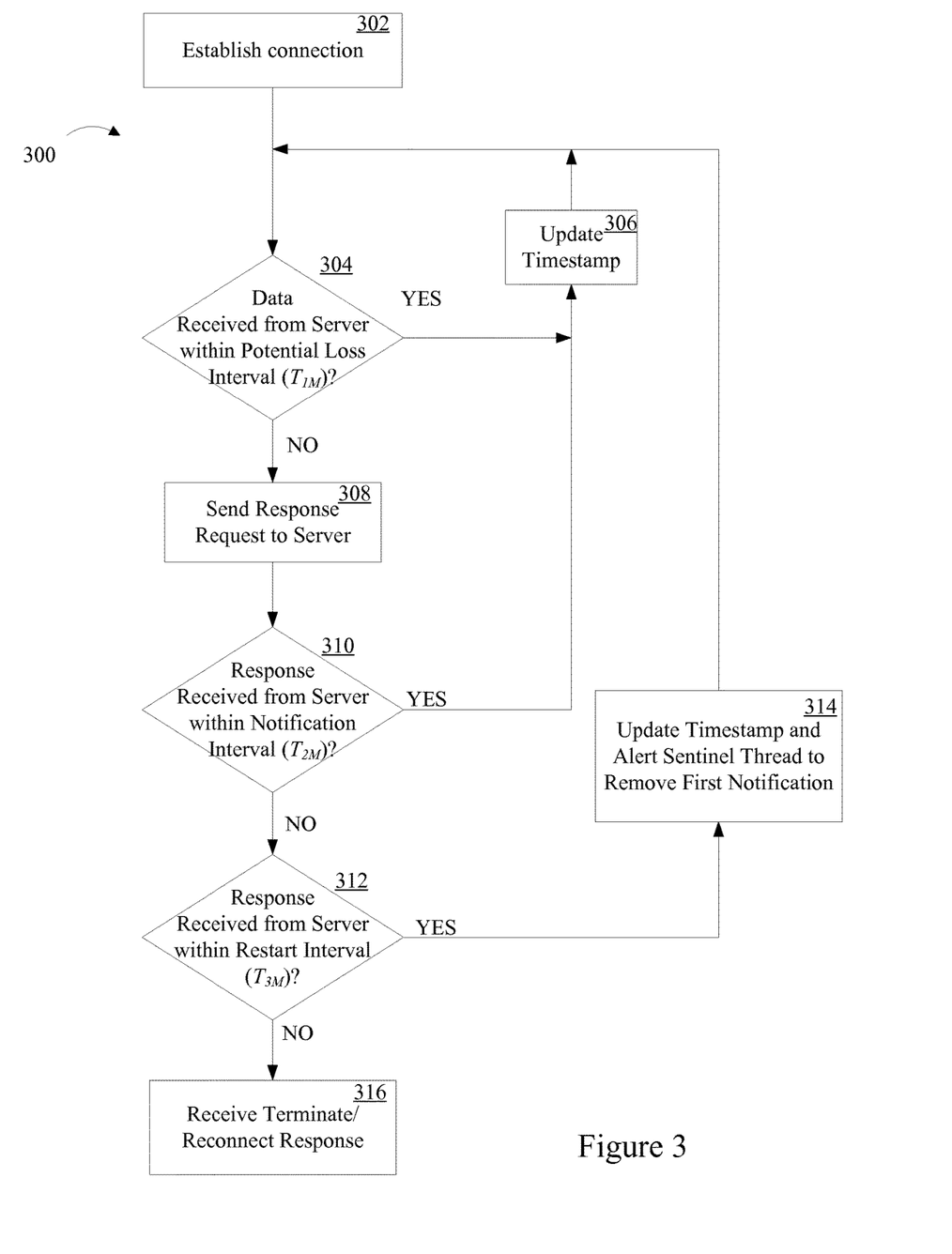
FIG. 3 is a flow chart of an example main thread of a remote desktop application in accordance with an example.

Referring now to FIG. 3, a flow chart illustrates an example main thread of a remote desktop application in accordance with an example. The example process 300 may be executed by the main thread of a remote desktop running on a remote terminal. In this regard, the remote terminal by be used by a user to access services, data or programs on a server, such as the enterprise server 104 of FIG. 1. In the illustrated process 300 of FIG. 3, the main thread starts with the establishment of a connection between the remote terminal and the server (block 302). In some examples, a sentinel thread may be launched at the same time as the main thread. The operation of an example sentinel thread is described below with reference to FIG. 4. As noted above, the connection may be through a variety of arrangements, including a variety of networks, such as the Internet. The establishment of the connection may be performed in conjunction with, or be followed by, the execution of a remote desktop program, such as the Remote Desktop Protocol (RDP).

As noted above, the main thread may be used by the remote desktop program, for example, for primary data exchange. In addition, protocol information may be exchanged through the main thread in various examples.

The main thread may monitor the communication link by updating a timestamp when data, or signals, are received from the server. In this regard, the data may include transmission of any information, such as packet information, for example, from the server to the remote terminal. Thus, as illustrated in FIG. 3, the main thread may determine whether any data is received from the server (block 304). In various examples, the frequency at which this determination is made may vary. Thus, the determination may be made at a potential connection loss interval of the main thread ($T_{1M}$) that may vary from one example to another. If the determination is made that data has, in fact, been received from the server, the main thread may update a timestamp associated with the connectivity between the server and the remote terminal (block 306). The main thread may then return to monitoring for newer data received to perform the determination of block 304 at, for example, a predetermined time interval.

If the determination is made at block 304 that no data has been received within the first time interval, a potential connection loss between the server and the remote terminal may be indicated. Thus, in various examples, the main thread may send a request to the server for a response (block 308). The main thread may then allow a second time interval (e.g., a notification interval) of the main thread ($T_{2M}$) for the server to respond to the request. The main thread may then make a determination of whether a response was received from the server within the notification interval of the main thread, $T_{2M}$ (block 310). If a response, or any other data, is in fact received before the expiration of the notification interval of the main thread $T_{2M}$, the main thread proceeds to update the timestamp (block 306).

In some examples, the notification interval of the main thread $T_{2M}$ corresponds to a time interval associated with the sentinel thread (described below with reference to FIG. 4 as $T_{2S}$) at which, if no response is received, the sentinel thread may display a first notification to the user, an example of which is described below with reference to FIG. 5. In other examples, rather than launching the sentinel thread at the same time as the start of the main thread, the sentinel thread may be initially launched only after no response to the request is received from the server by the expiration of the notification interval of the main thread $T_{2M}$.

In still other examples, the sentinel thread may be launched at the same time as the start of the main thread, but the main thread may not take any action at the expiration of the notification interval of the main thread $T_{2M}$. Instead, the main thread may rely upon operation of the sentinel thread to monitor connectivity. In this regard, the main thread's role in monitoring connectivity is limited to updating the timestamp, sending the request (block 308) and determining if a response is received (block 310).

Returning now to block 310, if the determination is made at block 310 that no response was received from the server to the request sent by the main thread before the expiration of the notification interval of the main thread $T_{2M}$, the main thread may continue waiting for a response from the server to the response request and may make a determination of whether a response was received from the server within the a restart interval of the main thread, $T_{3M}$ (block 312). If a response, or any other data, is received before the expiration of the restart interval of the main thread $T_{3M}$, the main thread updates the timestamp and alerts the sentinel thread to remove the first notification (block 314) if the first notification had already been presented to the user.

In some examples, if the determination is made at block 312 that no response was received from the server to the request sent by the main thread within the restart interval of the main thread $T_{3M}$, the main thread may alert the sentinel thread to display a second notification (e.g., as described below with reference to FIG. 6) and await a response from the user (block 316). The user may elect to terminate the connection or to reconnect with the server. If the user elects to reconnect, the process may begin again at block 302.

Figure 4:
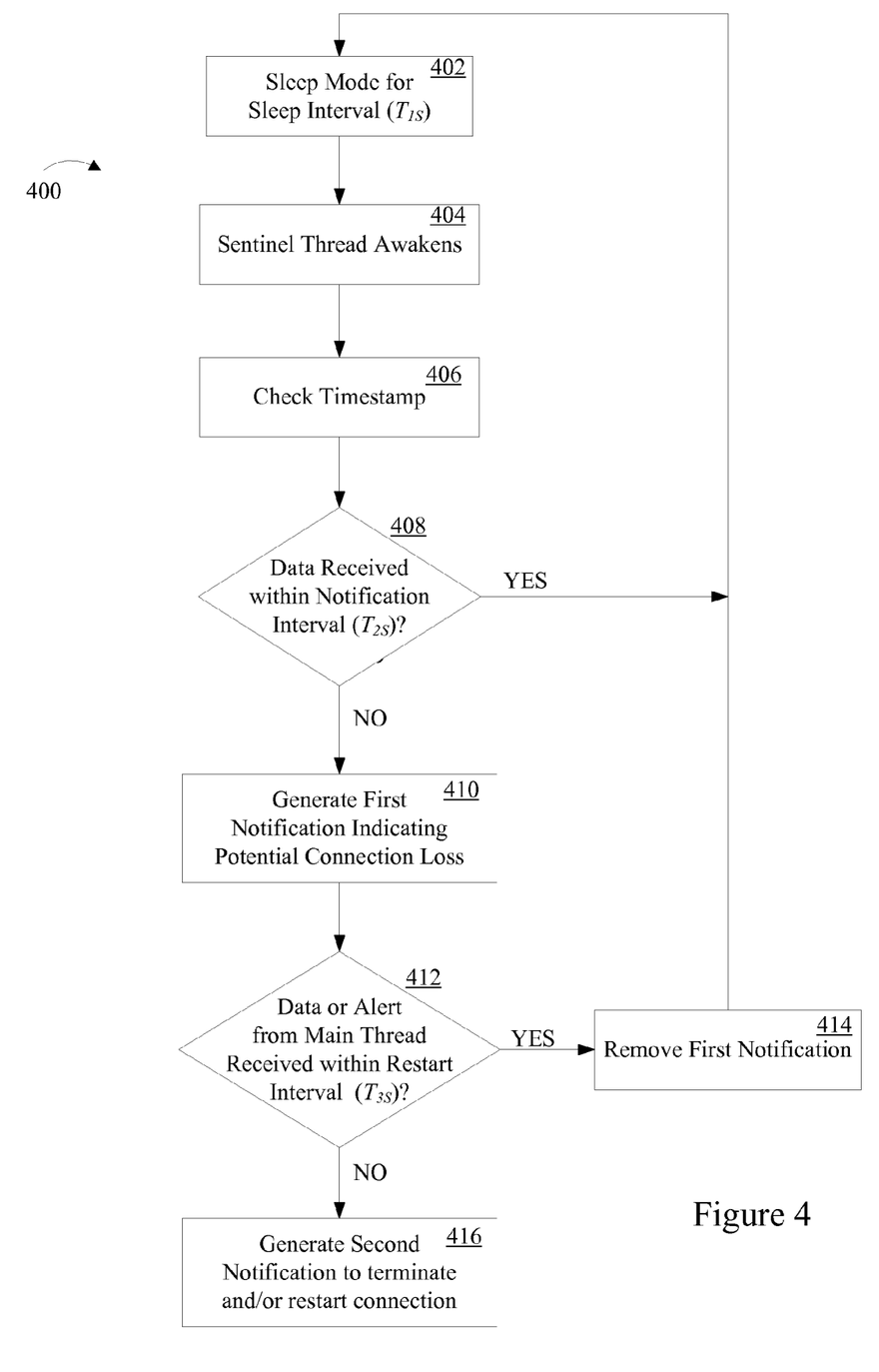
FIG. 4 is a flow diagram of an example sentinel thread of a remote desktop application in accordance with an example.

Referring now to FIG. 4, a flow chart illustrates an example sentinel thread of the remote desktop application in accordance with an example. The example process 400 may be executed by the sentinel thread of the remote desktop running on a remote terminal. In the illustrated process 400 of FIG. 4, in order to conserve resources (e.g., bandwidth), the sentinel thread may enter a sleep mode for a sleep interval (block 402). The length of time that the sentinel thread remains asleep (e.g., the sleep interval $T_{1S}$) may vary for various examples. In one example, $T_{1S}$ is calculated from the time at which the sentinel thread awakens or initially launched. In other examples, $T_{2S}$ may be calculated from the timestamp of the last data received. In some other examples, the sleep interval $T_{1S}$ may be based on the first notification interval of the main thread, $T_{2M}$.

Upon expiration of the sleep interval $T_{1S}$, the sentinel thread may awaken from a sleep mode (block 404). As noted above, in some examples, the sentinel thread may be launched at the same time the main thread, while in other examples, the sentinel thread may be launched at a later time, such as when a determination is made by the main thread that no response to the request is received within the second time interval (e.g., block 310 of FIG. 3).

Upon awakening (or initially launching), the example sentinel thread may check the timestamp associated with the connectivity between the server and the remote terminal (block 406). As noted above, the timestamp may indicate a time at which the main thread indicated receipt of data from the server. In some examples, the timestamp indicates the last time at which data was received. As noted above, the frequency at which the main thread updates the timestamp may vary in various examples.

The sentinel thread may then make a determination whether any data is received from the server during a notification time interval of the sentinel thread ($T_{2S}$) (block 408). The notification time interval $T_{2S}$ may vary from one example to another. In various examples, the notification interval of the sentinel thread ($T_{2S}$) is selected to be sufficiently large to allow for normal or expected periods of no data being received from the server. In some examples, the notification interval of the sentinel thread ($T_{2S}$) is the length of the sleep interval of the sentinel node ($T_{1S}$) described above. In other examples, the notification interval of the sentinel thread ($T_{2S}$) is the same length as the notification interval of the main thread ($T_{2M}$).

If the determination is made at block 408 that the timestamp has, in fact, been updated within the notification interval of the sentinel thread ($T_{2S}$), the sentinel thread may conclude the connection between the server and the remote terminal is uninterrupted and may enter sleep mode (block 402) and wait for the sleep interval of the sentinel thread ($T_{1S}$) to check the timestamp again.

If the determination is made at block 408 that no data has been received within the notification interval of the sentinel thread ($T_{2S}$), the sentinel thread may generate a first notification to the user to indicate a potential connection loss with the server (block 410).

Figure 5:
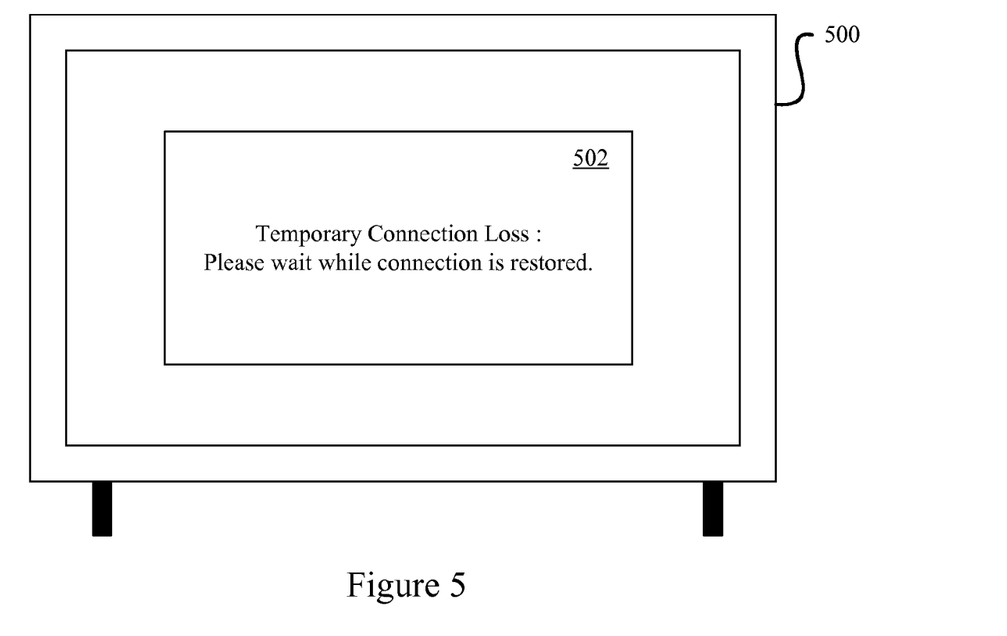
FIG. 5 is an example screenshot of a first notification which may be provided in accordance with an example.

In various examples, the first notification is generated for display at the remote terminal A screenshot of an example first notification on the display of the remote terminal is illustrated in FIG. 5A. The first notification may be provided in a variety of manners in various examples. For example, the first notification may include causing the screen colors to turn to grayscale or generating a pop-up dialog box 502 on the display 500, as illustrated in FIG. 5. The first notification may notify the user of a temporary or potential connection loss. In some examples, the pop-up dialog box 502 may include a count-down timer or indication of what next steps the user should follow to continue the remote desktop session. In other examples, the user may be allowed to navigate the grayscale display screen, minimize or close the dialog box, and terminate the remote connection. In other examples, the first notification merely serves to notify the user without allowing the user to take any action related to the notification.

After generation of the first notification, the sentinel thread determines if any data has been received within a restart interval of the sentinel thread ($T_{3S}$) (block 412). In various examples, the length of the restart interval of the sentinel thread ($T_{3S}$) may be based on, or the same as, the restart interval of the main thread ($T_{3M}$). In making the determination at block 412, the sentinel thread may check the timestamp for any updates. In other examples, the sentinel thread may monitor traffic from the server to the remote terminal in making the determination.

If the determination is made at block 412 that data has been received before the expiration of the restart interval of the sentinel thread $T_{3S}$, the sentinel thread may remove the first notification (block 414), indicating to the user that any interruption in the connectivity between the server and the remote terminal has been resolved. Following removal of the first notification, the sentinel thread may enter sleep mode (block 402).

Figure 6:
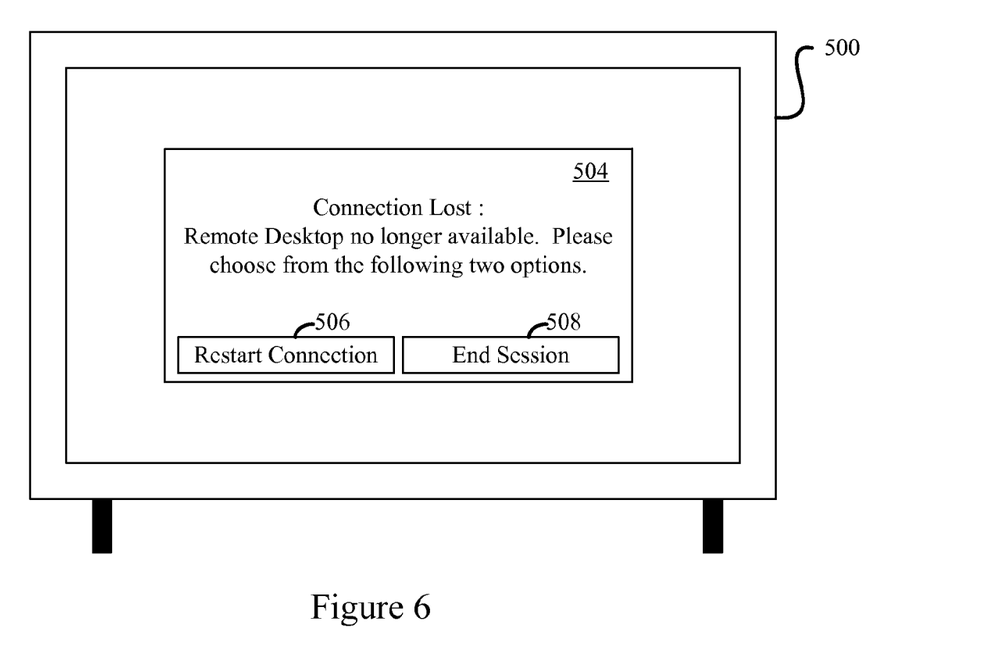
FIG. 6 is an example screenshot of a second notification which may be provided in accordance with an example.

If the sentinel thread determines that no data has been received before the expiration of the restart interval of the sentinel thread $T_{3S}$, the sentinel thread may conclude that connectivity between the server and the remote terminal has been irretrievably lost. Accordingly, the sentinel thread may generate a second notification to the remote terminal to either terminate or restart the connection (block 416). In various examples, the second notification may be a new dialog box to replace the dialog box of the first notification. An example second notification on the display screen 500 of the remote terminal is illustrated in FIG. 6. In some examples, the display of the remote terminal may remain grayscale from the first notification through the second notification. In other examples, the screen color may be restored and only a dialog box 504 indicating a permanent connection loss may be provided. The dialog box 504 may also provide the user with various options for the remote desktop session. For example, in the illustrated example of FIG. 6, a first option 506 may allow the user to elect to restart the remote desktop session. This may entail terminating the existing session and forming a new connection with the server computer. A second option may allow the user to terminate the connection and end the user's remote desktop session.

The various time intervals described above with reference to FIGS. 3 and 4 may be either pre-programmed, pre-determined, customized or calculated by the various threads. For example, as noted above, the length of the sleep interval of the sentinel node $T_{2S}$, may be determined by the sentinel thread based on the timestamp. In other examples, other factors may be used to adaptively determine the various time intervals. For example, factors used to determine the various time intervals may include the amount of traffic through the connection, the bandwidth associated with the connection, or the like.

In one example, the first and second time intervals of the main thread, $T_{1M}$ and $T_{2M}$, may be selected such that any response from the server to the request of block 308 is received prior to the expiration of the third time interval of the sentinel thread (i.e., restart interval, $T_{3S}$).

Various examples described herein are described in the general context of method steps or processes, which may be implemented in one example by a software program product or component, embodied in a machine-readable medium, including executable instructions, such as program code, executed by entities in networked environments. Generally, program modules may include routines, programs, objects, components, data structures, etc. that perform particular tasks or implement particular abstract data types. Executable instructions, associated data structures, and program modules represent examples of program code for executing steps of the methods disclosed herein. The particular sequence of such executable instructions or associated data structures represents examples of corresponding acts for implementing the functions described in such steps or processes.

The foregoing description of various examples has been presented for purposes of illustration and description. The foregoing description is not intended to be exhaustive or limiting to the precise form disclosed, and modifications and variations are possible in light of the above teachings or may be acquired from practice of various examples. The examples discussed herein were chosen and described in order to explain the principles and the nature of various examples and its practical application to enable one skilled in the art to utilize the various examples and with various modifications as are suited to the particular use contemplated. The features of the examples described herein may be combined in all possible combinations of methods, apparatus, modules, systems, and computer program products.

What is claimed is:

1. A method comprising:
   determining, by a terminal, whether or not data has been received from a server within a notification time interval, the determining based on a timestamp indicative of receipt of data by the terminal from the server;
   in response to determining, based on the timestamp, that no data has been received from the server by the terminal within the notification time interval, causing display, by the terminal, of a first notification indicating a potential interruption in connectivity over a network between the server and the terminal;
   in response to determining that the potential interruption is resolved before expiration of a restart time interval, removing, by the terminal, the first notification; and
   in response to determining that the potential interruption is not resolved before the expiration of the restart time interval, presenting, by the terminal, a second notification indicating a loss of connectivity between the server and the terminal.

2. The method of claim 1, further comprising:
   launching a main thread in the terminal for primary exchange of data between the server and the terminal; and
   launching a sentinel thread in the terminal, wherein the causing the display of the first notification and the presenting the second notification are performed by the sentinel thread.

3. The method of claim 2, further comprising, in response to the potential interruption being resolved before the expiration of the restart time interval, entering, by the sentinel thread, a sleep mode for a sleep interval.

4. The method of claim 2, further comprising updating, by the main thread, a timestamp in response to determining that data has been received by the terminal from the server.

5. The method of claim 4, further comprising sending, by the main thread, a request from the terminal to the server for a response in response to determining that no data is received from the server within a first time interval, wherein the determining of whether data has been received from the server within the notification time interval comprises determining whether the response to the request has been received within the notification time interval.

6. A non-transitory computer-readable medium storing instructions that upon execution cause a terminal to:
   launch a main thread for data exchange between the terminal and a server;
   launch a sentinel thread that upon execution causes the terminal to:
      determine whether or not data has been received by the terminal from a server within a notification time interval, the determining based on a timestamp indicative of receipt of data by the terminal from the server;
      in response to determining, based on the timestamp, that no data has been received from the server by the terminal within the notification time interval, indicate a potential interruption in connectivity between the server and the terminal;
      cause display of a first notification indicating the potential interruption;

in response to determining that the potential interruption is resolved before expiration of a restart time interval, remove the first notification; and in response to determining that the potential interruption is not resolved before the expiration of the restart time interval, present a second notification indicating a loss of connectivity between the server and the terminal.

7. The non-transitory computer-readable medium of claim 6, wherein the sentinel thread upon execution causes the terminal to, in response to the potential interruption being resolved before the expiration of the restart time interval, cause the sentinel thread to enter a sleep mode for a sleep interval.

8. The non-transitory computer-readable medium of claim 6, wherein the main thread updates a timestamp in response to determining that data has been received by the terminal from the server.

9. The non-transitory computer-readable medium of claim 8, wherein the main thread sends a request from the terminal for a response to the server in response to determining that no data is received from the server within a first time interval, wherein the determining of whether or not data has been received from the server by the terminal within the notification time interval comprises determining whether the response to the request has been received within the notification time interval.

10. A terminal, comprising:
a processor; and
a memory device including computer program code, the computer program code executable on the processor to:
   determine whether or not data has been received by the terminal from a server within a notification time interval, the determining based on a timestamp indicative of receipt of data by the terminal from the server;
   in response to determining, based on the timestamp, that no data has been received from the server by the terminal within the notification time interval, cause display of a first notification indicating a potential interruption in connectivity between the server and the terminal;
   remove the first notification in response to determining that the potential interruption is resolved before expiration of a restart time interval; and
   present a second notification in response to determining that the potential interruption is not resolved before the expiration of the restart time interval, the second notification indicating a loss of connectivity between the server and the terminal.

11. The terminal of claim 10, wherein the computer program code is executable to further:
launch a main thread for primary exchange of data between the server and the terminal; and
launch a sentinel thread, wherein the causing display of the first notification and the presenting the second notification are performed by the sentinel thread.

12. The terminal of claim 11, wherein the computer program code is executable to further, in response to determining that the potential interruption is resolved before the expiration of the restart time interval, cause the sentinel thread to enter a sleep mode for a sleep interval.

13. The method of claim 1, wherein the second notification comprises an option selectable by a user, the method further comprising:
restarting a connection between the terminal and the server in response to selection of the option in the second notification by the user.

14. The method of claim 13, wherein the restarting of the connection comprises restarting a session according to a Remote Desktop Protocol.

15. The method of claim 13, wherein the second notification further comprises a second option selectable by the user, the method further comprising:
terminating a connection between the terminal and the server in response to selection of the second option in the second notification by the user.

16. The non-transitory computer-readable medium of claim 6, wherein the second notification comprises an option selectable by a user, the instructions upon execution causing the terminal to further:
restart a connection between the terminal and the server in response to selection of the option in the second notification by the user.

17. The non-transitory computer-readable medium of claim 16, wherein the restarting of the connection comprises restarting a session according to a Remote Desktop Protocol.

* * * * *

UNITED STATES PATENT AND TRADEMARK OFFICE
CERTIFICATE OF CORRECTION

PATENT NO.       : 9,525,607 B2                                          Page 1 of 1
APPLICATION NO.  : 13/742806
DATED            : December 20, 2016
INVENTOR(S)      : Daryl T. Poe It is certified that error appears in the above-identified patent and that said Letters Patent is hereby corrected as shown below:

In sheet 4 of 5, reference numeral 402, Line 1, delete "Slccp" and insert -- Sleep --, therefor.

In sheet 5 of 5, reference numeral 504, Line 3, delete "choosc" and insert -- choose --, therefor.

In sheet 5 of 5, reference numeral 506, Line 1, delete "Rcstart Conncction" and insert -- Restart Connection --, therefor.

In sheet 5 of 5, reference numeral 508, Line 1, delete "Scssion" and insert -- Session --, therefor.

Signed and Sealed this
Fourteenth Day of March, 2017

Michelle K. Lee
*Director of the United States Patent and Trademark Office*